United States Patent
Zhang et al.

(10) Patent No.: US 12,158,856 B2
(45) Date of Patent: Dec. 3, 2024

(54) DATA TRANSMISSION APPARATUS AND DATA TRANSMISSION SYSTEM

(71) Applicant: Beijing Tusen Zhitu Technology Co., Ltd., Beijing (CN)

(72) Inventors: Yu Zhang, Beijing (CN); Jianan Hao, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/651,763

(22) Filed: Feb. 18, 2022

(65) Prior Publication Data

US 2022/0261371 A1 Aug. 18, 2022

(30) Foreign Application Priority Data

Feb. 18, 2021 (CN) .......................... 202110186744.7

(51) Int. Cl.
*G06F 13/40* (2006.01)
*B60R 16/023* (2006.01)
*B60W 60/00* (2020.01)

(52) U.S. Cl.
CPC ...... *G06F 13/4068* (2013.01); *B60R 16/0231* (2013.01); *B60W 60/001* (2020.02)

(58) Field of Classification Search
CPC .... H04W 4/44; B60R 16/0231; B60R 16/023; B60W 60/001; G06F 13/4068; G06F 11/3089; G06F 15/7807; G06F 15/7867
See application file for complete search history.

(56) References Cited

U.S. PATENT DOCUMENTS

| | | | |
|---|---|---|---|
| 10,873,726 B1* | 12/2020 | Maldonado | H04N 17/004 |
| 2018/0032064 A1* | 2/2018 | Fang | G05B 19/4183 |
| 2018/0167211 A1* | 6/2018 | Falk | H04L 9/0869 |
| 2019/0019358 A1 | 1/2019 | McConkey et al. | |
| 2019/0250611 A1* | 8/2019 | Costin | G05D 1/0257 |
| 2020/0065690 A1* | 2/2020 | Neri | G06N 3/084 |

(Continued)

FOREIGN PATENT DOCUMENTS

| | | |
|---|---|---|
| CN | 108762279 A | 11/2018 |
| CN | 109032113 A | 12/2018 |
| CN | 109557997 A | 4/2019 |

(Continued)

OTHER PUBLICATIONS

European Patent Office, Extended European search report for EP 22156598.9, Mailing Date: Jul. 12, 2022, 10 pages.

*Primary Examiner* — Idriss N Alrobaye
*Assistant Examiner* — Richard B Franklin
(74) *Attorney, Agent, or Firm* — Perkins Coie LLP

(57) ABSTRACT

The present disclosure provides a data transmission apparatus and a data transmission system. The data transmission apparatus comprises a first transmission unit and a second transmission unit. The first transmission unit comprises a plurality of sensor interfaces and is configured to receive sensor data from a plurality of sensors through the plurality of sensor interfaces, and the second transmission unit comprises a computing system interface and is configured to receive the sensor data from the first transmission unit and to send the sensor data to a computing system through the computing system interface.

16 Claims, 5 Drawing Sheets

(56) References Cited

U.S. PATENT DOCUMENTS

2021/0001880 A1* 1/2021 Hu ........................ G06N 3/063
2021/0148966 A1* 5/2021 Yamahira .............. H02P 29/028

FOREIGN PATENT DOCUMENTS

| CN | 109799493 A | 5/2019 |
| CN | 109814552 A | 5/2019 |
| CN | 111025959 A | 4/2020 |
| CN | 111279280 A | 6/2020 |
| CN | 111604899 A | 9/2020 |
| CN | 111629344 A | 9/2020 |
| CN | 211956161 U | 11/2020 |

* cited by examiner

DATA TRANSMISSION APPARATUS AND DATA TRANSMISSION SYSTEM

CROSS-REFERENCE TO RELATED APPLICATIONS

The present disclosure claims priority to Chinese Patent Application No. 202110186744.7, titled "DATA TRANSMISSION APPARATUS AND DATA TRANSMISSION SYSTEM", filed on Feb. 18, 2021, the content of which is incorporated herein by reference in its entirety.

TECHNICAL FIELD

The present disclosure relates to autonomous driving technology, and particularly to a data transmission apparatus and a data transmission system for transmitting data between sensors and a computing system.

BACKGROUND

With the development of autonomous driving technology, autonomous vehicles have been applied in the fields of logistics freight, passenger carrying and the like. When an autonomous vehicle is running, it generally senses external road information by its sensors, such as radars and cameras. Then, an autonomous driving server and the like perform operation to complete decision and planning of driving of the autonomous vehicle, and finally, the autonomous vehicle is controlled to drive according to the corresponding decision and planning. In order to secure the safety of the autonomous vehicle, it is to ensure stable data transmission between the sensors and the server.

SUMMARY

The present disclosure provides a data transmission apparatus and a data transmission system for transmitting data between sensors and a computing system to ensure stable data transmission between the sensors and a server.

In one aspect, the present disclosure provides a data transmission apparatus for transmitting data between sensors and a computing system, which comprises: a first transmission unit comprising a plurality of sensor interfaces and configured to receive sensor data from a plurality of sensors through the plurality of sensor interfaces, and a second transmission unit comprising a computing system interface and configured to receive the sensor data from the first transmission unit and to send the sensor data to the computing system through the computing system interface.

In another aspect, the present disclosure provides a data transmission system for transmitting data between sensors and a computing system, wherein the sensors comprise at least a first set of sensors and a second set of sensors, the computing system comprises a first computing apparatus and a second computing apparatus, and the data transmission system comprises: a first data transmission apparatus comprising a first set of sensor interfaces and a first computing system interface and configured to receive first sensor data from the first set of sensors through the first set of sensor interfaces and to send the first sensor data to the first computing apparatus through the first computing system interface, and a second data transmission apparatus comprising a second set of sensor interfaces and a second computing system interface and configured to receive second sensor data from the second set of sensors through the second set of sensor interfaces and to send the second sensor data to the second computing apparatus through the second computing system interface, wherein the first data transmission apparatus is further configured to send the first sensor data to the second computing apparatus through the second data transmission apparatus, and the second data transmission apparatus is further configured to send the second sensor data to the first computing apparatus through the first data transmission apparatus.

According to the embodiment of the present application, the interface (namely the sensor interface) of the data transmission apparatus for receiving the sensor data and the interface (namely the computing system interface) of the data transmission apparatus for outputting the sensor data are formed in different units, such that the complexity of the transmission apparatus can be reduced, occurrence of faults can be decreased, and the searching of fault causes can be facilitated in the case of a transmission apparatus fault.

BRIEF DESCRIPTION OF THE DRAWINGS

The accompanying drawings illustrate the exemplary embodiments and constitute a part of the specification, and, together with the text description of the specification, are provided to illustrate the exemplary implementations of the embodiments. It is obvious that the accompanying drawings described below are only some embodiments of the present invention. For one of ordinary skilled in the art, other drawings can be derived from the accompanying drawings without creative effort. Throughout the accompanying drawings, identical reference numerals designate similar elements.

DETAILED DESCRIPTION

In order to make the purposes, technical schemes and advantages of the present invention more apparent, the present invention will be described in further detail with reference to the accompanying drawings. It is obvious that the described embodiments are only part of the embodiments of the present invention rather than all of the embodiments. All other embodiments obtained by one of ordinary skilled in the art without making any creative effort based on the embodiments of the present invention shall fall within the protection scope of the present invention.

In the present disclosure, unless otherwise specified, the term "plurality" means two or more. In the present disclosure, the term "and/or" describes an associative relationship between associated objects, and encompasses any of and all possible combinations of the listed objects. The character "/" generally indicates an "or" relationship between the associated objects.

In the present disclosure, unless otherwise specified, the terms "first", "second", and the like are used for distinguishing between similar objects, and are not intended to limit position relationships, timing relationships, or importance relationships thereof. It is to be understood that the terms used in this manner are interchangeable under appropriate circumstances so that the embodiments of the present invention described herein can be implemented in other manners in addition to those illustrated or described herein.

Moreover, the terms "comprise" and "have" and any variations thereof are intended to cover non-exclusive inclusion. For example, a process, method, system, product or device comprising a series of steps or units is not necessarily limited to the explicitly listed steps or units, but may comprise other steps or units that are not explicitly listed or are inherent in the process, method, system, product or device.

Figure 1:
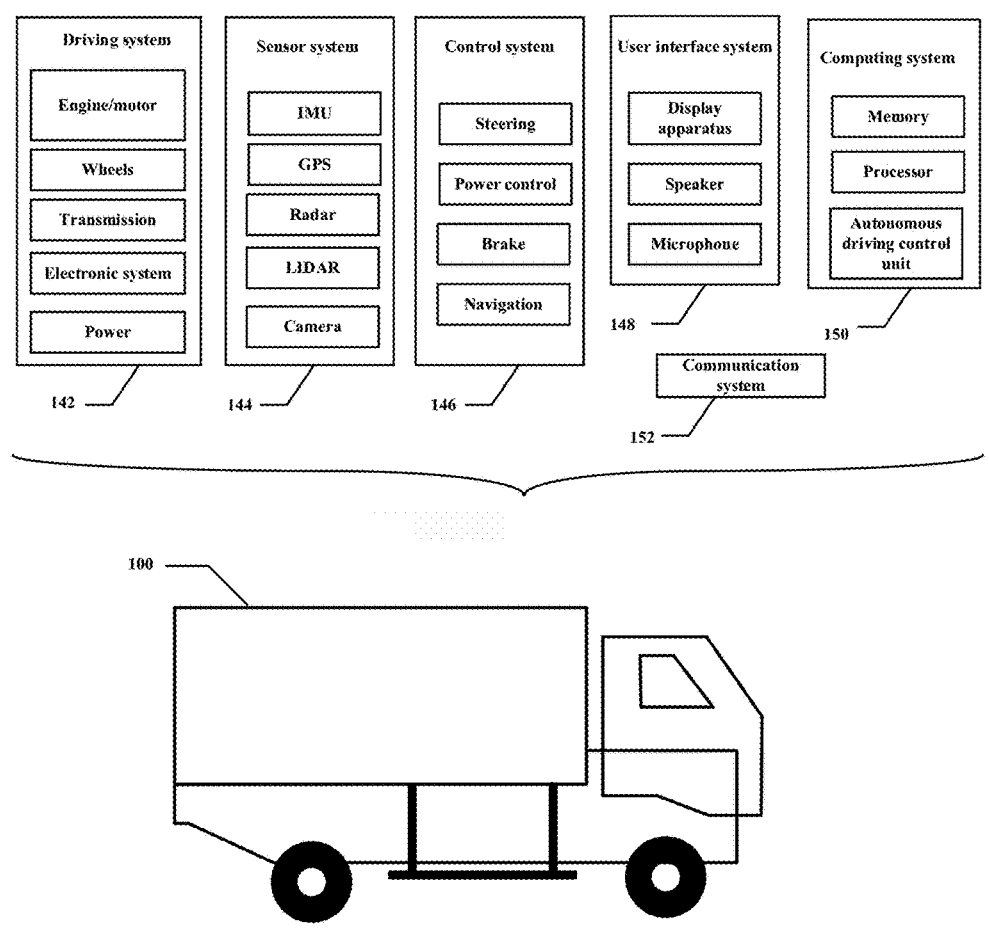
FIG. 1 is a schematic diagram of a vehicle in which various techniques disclosed herein can be implemented.

FIG. 1 is a schematic diagram of a vehicle 100 in which various techniques disclosed herein can be implemented. The vehicle 100 may be a car, a truck, a motorcycle, a bus, a watercraft, an airplane, a helicopter, a hay mower, an excavator, a snowmobile, an aircraft, a recreational vehicle, an amusement park vehicle, a farm equipment, a construction equipment, a tram, a golf cart, a train, a trolley bus or other vehicles. The vehicle 100 can be operated fully or partially in an autonomous driving mode. The vehicle 100 can control itself in the autonomous driving mode. For example, the vehicle 100 can determine a current state of the vehicle and a current state of an environment in which the vehicle is located, determine a predicted behavior of at least one other vehicle in this environment, and determine a trust level corresponding to a likelihood that the at least one other vehicle performs the predicted behavior, and thus the vehicle 100 can control itself based on these determined information. The vehicle 100, when in the autonomous driving mode, can be operated without human interaction.

The vehicle 100 may comprise various vehicle systems, such as a driving system 142, a sensor system 144, a control system 146, a user interface system 148, a computing system 150, and a communication system 152. The vehicle 100 may comprise more or fewer systems, each of which may comprise a plurality of units. Further, each system and unit of the vehicle 100 can be interconnected. For example, the computing system 150 can be in data communication with one or more of the driving system 142, the sensor system 144, the control system 146, the user interface system 148 and the communication system 152. Thus, one or more of the described functions of the vehicle 100 may be divided into additional functional or physical components or combined into a fewer number of functional or physical components. In a still further example, additional functional or physical components may be added to the example shown in FIG. 1.

The driving system 142 may comprise a plurality of operable components (or units) that provide kinetic energy for the vehicle 100. In one embodiment, the driving system 142 may comprise an engine or a motor, wheels, a transmission, an electronic system, and power (or a power source). The engine or motor may be any combination of the following apparatuses: an internal combustion engine, an electrical machine, a steam engine, a fuel cell engine, a propane engine or other forms of engines or motors. In some embodiments, the engine may convert a source of power into mechanical energy. In some embodiments, the driving system 142 may comprise a variety of engines or motors. For example, a hybrid electric vehicle may comprise a gasoline engine and a motor, and may also comprise other combinations.

The wheels of the vehicle 100 may be standard wheels. The wheels of the vehicle 100 may be in a variety of forms including single wheel, dual wheel, three wheel or four wheel forms, such as four wheels on a car or a truck. Other numbers of wheels are possible, such as six or more wheels. One or more wheels of the vehicle 100 may be operated to rotate in a direction different from the other wheels. At least one wheel may be fixedly connected with the transmission. The wheel may comprise a combination of metal and rubber or a combination of other substances. The transmission may comprise a unit operable to transmit mechanical power of the engine to the wheels. For this purpose, the transmission may comprise a gearbox, a clutch, a differential gear and a propeller shaft. The transmission may also comprise other units. The propeller shaft may comprise one or more axles that mate with the wheels. The electronic system may comprise a unit for transmitting or controlling electronic signals of the vehicle 100. These electronic signals can be used to activate a plurality of lights, servos, motors and other electronically driven or controlled apparatuses in the vehicle 100. The power source may be an energy source that wholly or partially powers an engine or a motor. That is, the engine or the motor can convert the power source into mechanical energy. Exemplarily, the power source may include gasoline, petroleum, petroleum-based fuels, propane, other compressed gas fuels, ethanol, fuel cells, solar panels, batteries and other sources of electrical energy. The power source may additionally or optionally comprise any combination of a fuel tank, a battery, a capacitor or a flywheel. The power source may also provide power to other systems of the vehicle 100.

The sensor system 144 may comprise a plurality of sensors for sensing information about the environment and conditions of the vehicle 100. For example, the sensor system 144 may comprise an Inertial Measurement Unit (IMU), a GNSS (Global Navigation Satellite System) transceiver (e.g., a Global Positioning System (GPS) transceiver), a radar (RADAR), a laser rangefinder/LIDAR (or other distance measurement apparatuses), an acoustic sensor, an ultrasonic sensor and a camera (or other image capture apparatus). The sensor system 144 may comprise a plurality of sensors (e.g., oxygen (02) monitors, fuel gauge sensors, engine oil pressure sensors, temperature sensors, humidity sensors, and pressure sensors) configured to monitor the vehicle 100. Other sensors may also be configured. One or more sensors comprised in the sensor system 144 can be driven independently or collectively to update the position, orientation, or both of the one or more sensors.

The IMU may comprise a combination of sensors (e.g., an accelerometer and a gyroscope) for sensing position and direction changes of the vehicle 100 based on inertial acceleration. The GPS transceiver may be any sensor for estimating the geographic location of the vehicle 100. For this purpose, the GPS transceiver may comprise a receiver/a transmitter to provide positional information of the vehicle 100 relative to the earth. It should be noted that GPS is an example of the global navigation satellite system, and therefore, in some embodiments, the GPS transceiver may be replaced with the BeiDou satellite navigation system transceiver or the Galileo satellite navigation system transceiver. The radar unit may use radio signals to sense objects in the environment in which the vehicle 100 is located. In some embodiments, in addition to sensing objects, the radar unit may also be used to sense the speed and heading of an object approaching the vehicle 100. The laser rangefinder or LIDAR unit (or other distance measurement apparatuses) may be any sensor that uses a laser to sense objects in the environment in which the vehicle 100 is located. In one embodiment, the laser rangefinder/LIDAR unit may comprise a laser source, a laser scanner and a detector. The laser rangefinder/LIDAR unit is configured to operate in either a continuous (e.g., using heterodyne detection) or discontinuous detection mode. The camera may comprise apparatuses for capturing multiple images of the environment in which the vehicle 100 is located. The camera may be a still image camera or a motion video camera.

The control system 146 is configured to control the operation of the vehicle 100 and components (or units) thereof. Accordingly, the control system 146 may comprise various units, such as a steering unit, a power control unit, a brake unit and a navigation unit.

The steering unit may be a combination of machines that adjust the heading of the vehicle 100. The power control unit (which may be, e.g., an accelerator) may be, for example, used to control the operating speed of the engine and thereby the speed of the vehicle 100. The brake unit may comprise a combination of machines for decelerating the vehicle 100. The brake unit may use friction to decelerate the vehicle in a standard manner. In other embodiments, the brake unit may convert kinetic energy of the wheel into electric current. The brake unit may be in other forms as well. The navigation unit may be any system that determines a driving path or route for the vehicle 100. The navigation unit may also dynamically update the driving path as the vehicle 100 proceeds. The control system 146 may additionally or optionally comprise other components (or units) not shown or described.

The user interface system 148 can be configured to allow the interaction between the vehicle 100 and external sensors, other vehicles, other computer systems, and/or users of the vehicle 100. For example, the user interface system 148 may comprise a standard visual display apparatus (e.g., a plasma display, a Liquid Crystal Display (LCD), a touch screen display, a head-mounted display, or other similar displays), a speaker or other audio output apparatuses, a microphone, or other audio input apparatuses. For example, the user interface system 148 may also comprise a navigation interface and an interface to control the internal environment (e.g., temperature or fans) of the vehicle 100.

The communication system 152 may provide the vehicle 100 with a way to communicate with one or more devices or other vehicles in the vicinity. In one exemplary embodiment, the communication system 152 may communicate with one or more devices directly or through a communication network. The communication system 152 may be, for example, a wireless communication system. For example, the communication system may use 3G cellular communication (e.g., CDMA, EVDO or GSM/GPRS) or 4G cellular communication (e.g., WiMAX or LTE), and may also use 5G cellular communication. Optionally, the communication system may communicate with a Wireless Local Area Network (WLAN) (e.g., using WIFI®). In some embodiments, the communication system 152 may communicate directly with one or more devices or other vehicles around, for example, using infrared, Bluetooth® or ZIGBEE. Other wireless protocols, such as various in-vehicle communication systems, are also within the scope of the present application. For example, the communication systems may include one or more Dedicated Short Range Communication (DSRC) apparatuses, V2V apparatuses or V2X apparatuses that may be in data communication publicly or privately with vehicles and/or roadside stations.

The computing system 150 can control some or all of the functions of the vehicle 100. An autonomous driving control unit of the computing system 150 can be configured to identify, evaluate and avoid or overcoming potential obstacles in the environment in which the vehicle 100 is located. In general, the autonomous driving control unit can be configured to control the vehicle 100 in the absence of a driver or to provide assistance to the driver in controlling the vehicle. In some embodiments, the autonomous driving control unit is configured to combine data from a GPS transceiver, a radar, a LIDAR, a camera and other vehicle systems to determine a travel path or trajectory of the vehicle 100. The autonomous driving control unit can be activated to enable the vehicle 100 to be driven in an autonomous driving mode.

The computing system 150 may comprise at least one processor (which may comprise at least one microprocessor) that executes processing instructions (i.e., machine-executable instructions) stored in a non-volatile computer readable medium (e.g., a data storage apparatus or a memory). The computing system 150 may also be a plurality of computing apparatuses that distributedly control components or systems of the vehicle 100. In some embodiments, the memory may contain processing instructions that are executed by the processor to implement various functions of the vehicle 100 (e.g., program logic). In one embodiment, the computing system 150 can perform data communication with the driving system 142, the sensor system 144, the control system 146, the user interface system 148, and/or the communication system 152. The interfaces of the computing system are configured to facilitate data communication between the computing system 150 and the driving system 142, the sensor system 144, the control system 146, the user interface system 148, and the communication system 152.

The memory may also comprise other instructions, including instructions for data transmission, data reception, interaction, or control of the driving system 142, the sensor system 144, the control system 146 or the user interface system 148.

In addition to storing processing instructions, the memory may store a variety of information or data, such as image processing parameters, road maps and path information. These information may be used by the vehicle 100 and the computing system 150 during operation of the vehicle 100 in an autonomous mode, a semi-autonomous mode and/or a manual mode.

Although the autonomous driving control unit is shown as separated from the processor and the memory, it should be understood that, in some embodiments, some or all of the functions of the autonomous driving control unit can be implemented using program code instructions residing in one or more memories (or data storage apparatuses) and can be executed by the one or more processors, and that the autonomous driving control unit can be implemented using the same processor and/or memory (or data storage apparatuses) in some cases. In some embodiments, the autonomous driving control unit may be implemented, at least in part, using various application-specific circuit logics, various processors, various Field Programmable Gate Arrays ("FPGAs"), various Application-Specific Integrated Circuits ("ASICs"), various real-time controllers and hardware.

The computing system 150 may control functions of the vehicle 100 based on inputs received from various vehicle systems (e.g., the driving system 142, the sensor system 144 and the control system 146) or inputs received from the user interface system 148. For example, the computing system 150 may use inputs from the control system 146 to control the steering unit to avoid obstacles detected by the sensor system 144. In one embodiment, the computing system 150 may be configured to control various aspects of the vehicle 100 and systems thereof.

Although various components (or units) integrated into the vehicle 100 are shown in FIG. 1, one or more of the components (or units) may be mounted on the vehicle 100 or separately associated with the vehicle 100. For example, the computing system may exist partially or wholly independent of the vehicle 100. Thus, the vehicle 100 can exist in the form of separated or integrated device units. The device units constituting the vehicle 100 can communicate with each other in wired or wireless communication. In some embodiments, additional components or units may be added to various systems, or one or more components or units above (e.g., the LiDAR or radar as shown in FIG. 1) may be removed from the systems.

The present disclosure contemplates a data transmission apparatus for transmitting data between sensors and a computing system and a system comprising the apparatus. The data transmission apparatus comprises a first transmission unit and a second transmission unit. The first transmission unit comprises a plurality of sensor interfaces and is configured to receive sensor data from a plurality of sensors through the plurality of sensor interfaces, and the second transmission unit comprises a computing system interface and is configured to receive the sensor data from the first transmission unit and to send the sensor data to the computing system through the computing system interface. The interface (namely the sensor interface) of the data transmission apparatus for receiving the sensor data and the interface (namely the computing system interface) of the data transmission apparatus for outputting the sensor data are formed in different units, such that the complexity of the transmission apparatus can be reduced, occurrence of faults can be decreased, and the searching of fault causes can be facilitated in the case of a transmission apparatus fault.

Figure 2:
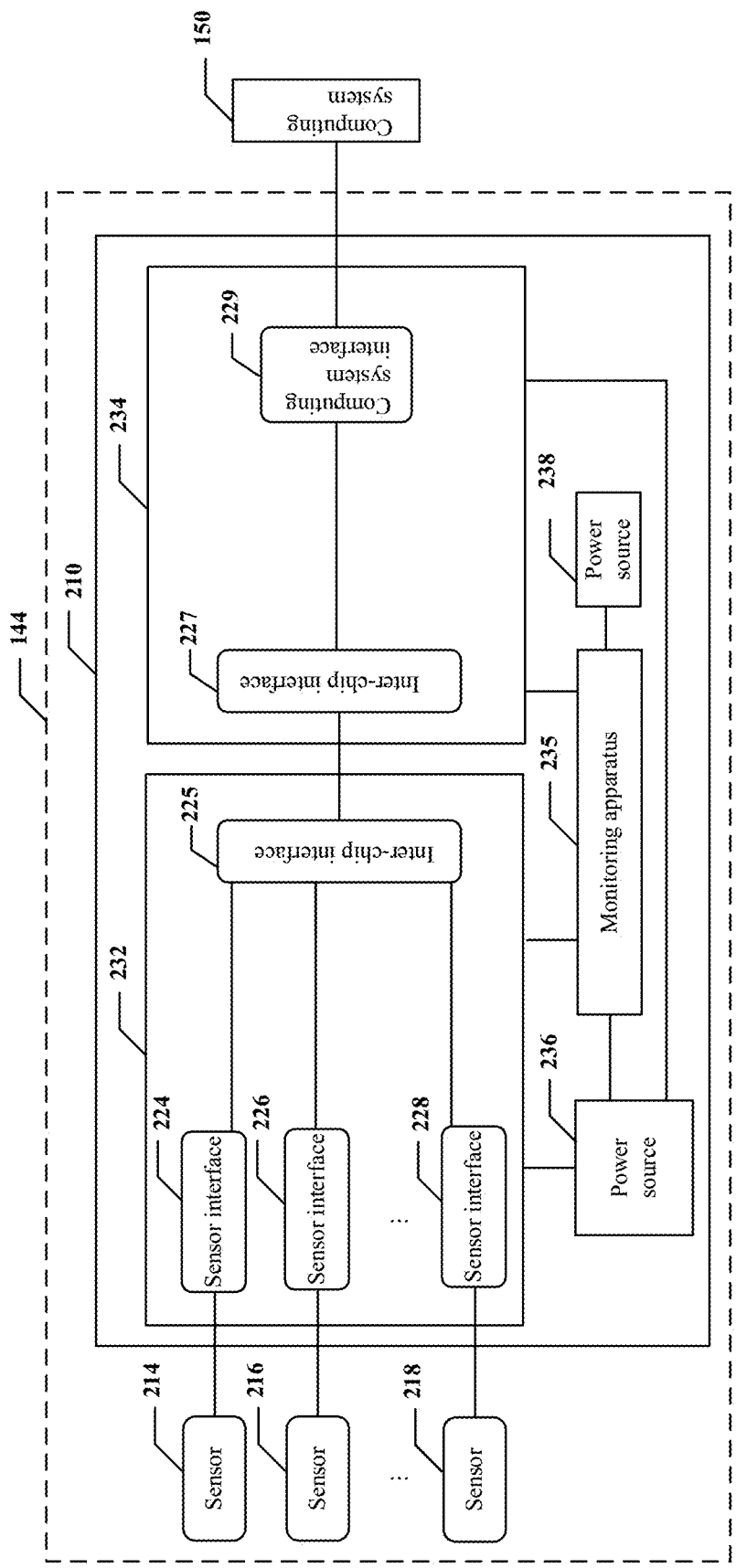
FIG. 2 is a schematic diagram of a sensor system according to an exemplary embodiment of the present disclosure.

FIG. 2 is a schematic diagram of a sensor system according to an exemplary embodiment of the present disclosure. As shown in FIG. 2, the sensor system 144 comprises a plurality of sensors (e.g., sensors 214, 216, 218) and a data transmission apparatus 210 (also referred to as a sensor unit). The data transmission apparatus 210 is connected between the sensors 214, 216, 218 and the computing system 150. Although three sensors are shown in FIG. 2, those skilled in the art will appreciate that the sensor system 144 may comprise more or fewer sensors.

The sensors 214, 216, 218 may include various sensors used in autonomous vehicles, such as an Inertial Measurement Unit (IMU), a Global Navigation Satellite System (GNSS) transceiver (e.g., a Global Positioning System (GPS) transceiver), a radar (RADAR), a laser rangefinder/LIDAR (or other distance measurement apparatuses), a solid-state laser radar, an acoustic sensor, an ultrasonic sensor and a camera or other image capture apparatuses. The sensors 214, 216, 218 may also include a plurality of sensors for monitoring the vehicle (such as an oxygen (02) monitor, a fuel gauge sensor, an engine oil pressure sensor, and temperature, humidity and pressure sensors).

The data transmission apparatus 210 may comprise a first transmission unit 232 and a second transmission unit 234. The first transmission unit 232 and/or the second transmission unit 234 may be implemented in the form of a Field Programmable Gate Array (FPGA), an Application-Specific Integrated Circuit (ASIC) or a System on Chip (SOC). In one implementation, the first transmission unit 232 and/or the second transmission unit 234 are implemented in the form of a programmable logic (PL) part of a System on Chip (SOC) (i.e., SOC PL).

The first transmission unit 232 may comprise an inter-chip interface 225, the second transmission unit 234 may comprise an inter-chip interface 227, and the first transmission unit 232 and the second transmission unit 234 may be connected to each other through the inter-chip interfaces 225, 227. The inter-chip interface may be, for example, a chip-to-chip (chip2chip) interface, or any high speed or high bandwidth interface that may enable inter-chip connections.

The first transmission unit 232 may also comprise a plurality of sensor interfaces, such as sensor interfaces 224, 226, 228, each of which may be connected with one or more sensors. For example, the sensor interface 224 may be connected with the sensor 214 to receive sensor data from the sensor 214, the sensor interface 226 may be connected with the sensor 216 to receive sensor data from the sensor 216, and the sensor interface 228 may be connected with the sensor 218 to receive sensor data from the sensor 218. The second transmission unit 234 may comprise a computing system interface 229 to connect with the computing system 150. The computing system 150 may comprise an autonomous driving control unit.

Each of the sensor interfaces 224, 226, 228 and the computing system interface 229 may be a Controller Area Network (CAN) interface, a Universal Asynchronous Receiver Transmitter (UART) interface, an Ethernet interface (e.g., Serial Gigabit Media Independent Interface (SGMII), a Reduced Gigabit Media Independent Interface (RGMII)), a Serial Peripheral Interface (SPI), a Base-TX interface (e.g., a Base-T1 interface), a camera interface, a Mobile Industry Processor Interface (MIPI), an Inter-Integrated Circuit (IIC) interface, an MIPI Camera Serial Interface (CSI), a high speed digital video interface (e.g., an FPD-LINK III), a high speed Peripheral Component Interconnect (PCIe) interface, a Universal Serial Bus (USB) interface, and various General Purpose Input/Output (GPIO) interfaces.

In one implementation, the sensor interfaces of the first transmission unit 232 are different from each other (i.e., using different transmission protocols).

In one implementation, at least two sensor interfaces of the first transmission unit 232 are different from each other (i.e., using different transmission protocols).

In one implementation, the first transmission unit 232 comprises one or more of a CAN interface, a UART interface, a camera interface, an SPI interface and an Ethernet interface (e.g., an SGMII interface and a RGMII interface). The CAN interface is connected with an ultrasound sensor and/or an IMU, the UART interface is connected with an IMU and/or a GNSS transceiver (e.g., a GPS transceiver), the camera interface (e.g., an MIPI interface or an FPD-LINK III interface) is connected with a camera (or connected with the camera via a serializer and a deserializer), one Ethernet interface is connected with a solid-state laser radar, another Ethernet interface is connected with a LIDAR, a radar and/or an ultrasound sensor, and the SPI interface is connected with a monitoring apparatus (which will be described in detail below). The computing system interface 229 may be an Ethernet interface (or any other high speed or high bandwidth interface).

In one implementation, the data transmission apparatus 210 further comprises power sources 236, 238 and a monitoring apparatus 235. The power source 236 is configured to supply power to the first transmission unit 232, the second transmission unit 234 and the deserializer (if present). For example, the voltage and the current of the power that the power source 236 supplies to each of the first transmission unit 232 and the second transmission unit 234 may be 5 volts and 25 amps, respectively, and the voltage and the current of the power that the power source 236 supplies to the deserializer may be 12 volts and 7 amps, respectively. The power source 238 may be, for example, a power source that meets the ASIL-D class standard for supplying power to the monitoring apparatus 235. The monitoring apparatus 235 is configured to monitor the first transmission unit 232, the second transmission unit 234 and the power source 236.

In one implementation, the data transmission apparatus 210 further comprises an Ethernet subsystem, wherein one or more sensors (e.g., a solid-state laser radar, a LIDAR, a radar and/or an ultrasonic sensor) are connected with the first transmission unit 232 through the Ethernet subsystem, and the second transmission unit 234 is connected with the computing system 150 through the Ethernet subsystem. The monitoring apparatus 235 may also monitor the Ethernet subsystem in addition to the first transmission unit 232, the second transmission unit 234 and the power source 236.

In one implementation, the number of sensor interfaces of the data transmission apparatus 210 is greater than the number of computing system interfaces, which is beneficial especially if the number of interfaces of the computing system is limited. If sensors are connected directly to the computing system when a limited number of interfaces of the computing system are present, a very limited number of sensors can be used. According to the present application, a plurality of sensors are connected to the data transmission apparatus 210, the sensors send the collected data to the data transmission apparatus, and the data transmission apparatus forwards the sensor data to the computing system. The data transmission apparatus may be connected with the computing system using only a small number of interfaces (e.g., only one interface) to transmit the sensor data. This can greatly expand the number of sensors that can be mounted on a vehicle (e.g., an autonomous vehicle) while saving the limited interface of the computing system.

In one embodiment, at least one sensor (e.g., the sensor 214) is a camera. The camera comprises an image sensor and a serializer therein. The data transmission apparatus 210 comprises a deserializer. The serializer is connected with the deserializer through a coaxial line or a twisted pair. The image sensor is configured to collect image data and transmit the collected image data to the serializer. The serializer is configured to convert image data received from the image sensor into a serial differential signal and send the serial differential signal to the deserializer. The deserializer is configured to parse the serial differential signal received from the serializer into image data, and send the image data obtained by parsing to the first transmission unit 232 through the sensor interface 224.

According to the present application, the interface (namely the sensor interface) of the data transmission apparatus for receiving the sensor data and the interface (namely the computing system interface) of the data transmission apparatus for outputting the sensor data are formed in different units (e.g., formed on different chips, such as on different FPGAs or different SOC PLs), such that the complexity of the transmission apparatus can be reduced and thus the likelihood of failure of the data transmission apparatus is reduced, which is particularly beneficial for autonomous vehicles. Catastrophic consequences may occur if the autonomous driving control unit cannot acquire sensor data in a timely manner while the autonomous vehicle is traveling. In addition, the interface (namely the sensor interface) of the data transmission apparatus for receiving the sensor data and the interface (namely the computing system interface) of the data transmission apparatus for outputting the sensor data are formed in different units, such that the complexity of the transmission apparatus can be reduced, and the searching of fault causes can be facilitated in the case of a data transmission apparatus fault.

According to the present application, the monitoring apparatus 235 monitors the first transmission unit 232, the second transmission unit 234, the power source 236 and other components (e.g., the deserializer and/or the Ethernet subsystem) (e.g., the monitoring apparatus may monitor the voltage, current, etc., of these components or units and compare them with a predetermined threshold) so as to detect a failure of these components in time, and the monitoring apparatus may determine an action to be taken, such as an emergency stop, based on the nature of the failure. The monitoring apparatus may also report the failure to the computing system or various vehicle controllers (e.g., Digital Signal Processors (DSPs), Electronic Control Units (ECUs), or Vehicle Control Units (VCUs)), which will determine the action to take. Since the monitoring apparatus 235 is powered by the power source 238 with a higher safety level than the power source 236, stable operation of the monitoring apparatus 235 can be ensured.

Figure 3:
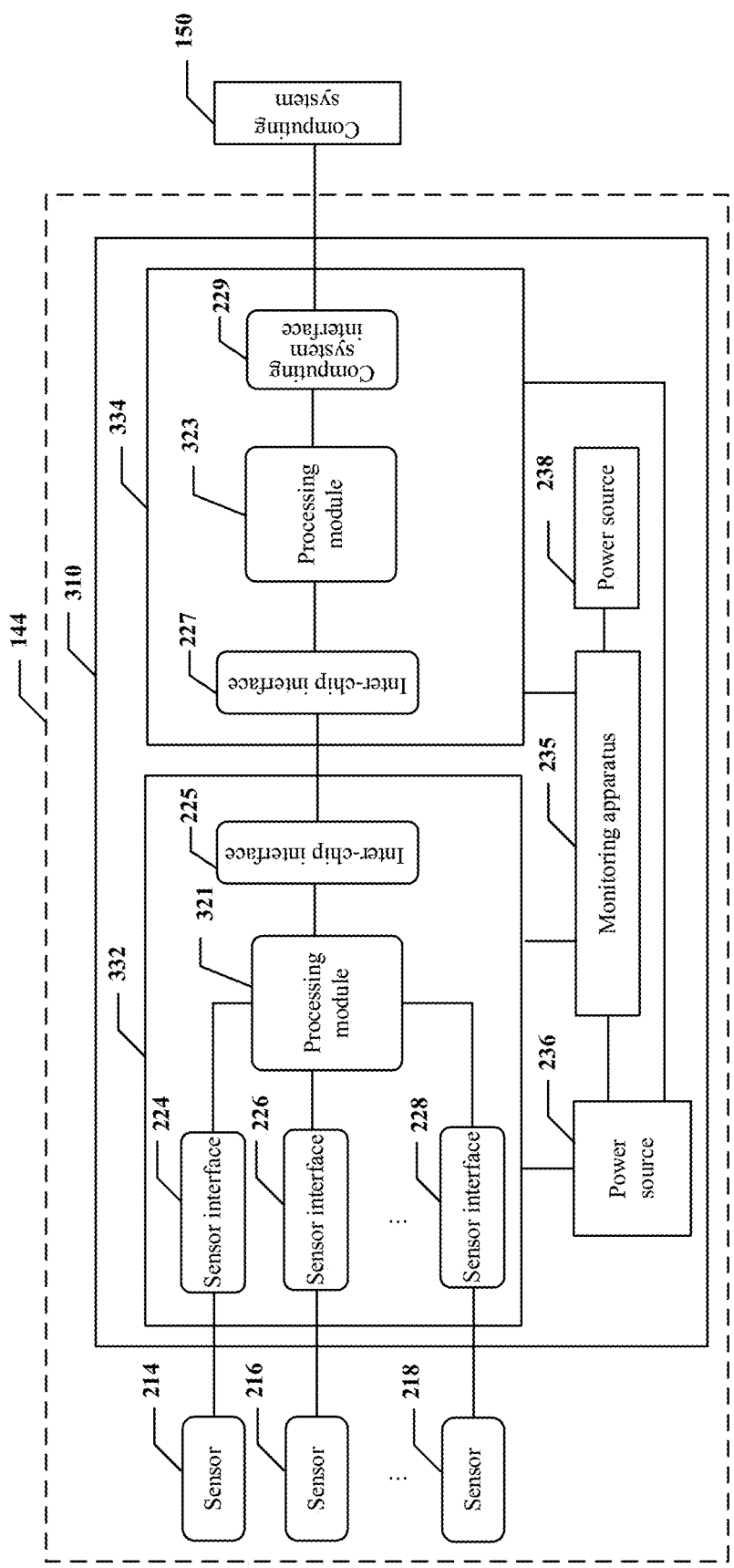
FIG. 3 is a schematic diagram of a sensor system according to another exemplary embodiment of the present disclosure.

FIG. 3 is a schematic diagram showing a sensor system according to another exemplary embodiment of the present disclosure. The sensor system of FIG. 3 differs from the sensor system of FIG. 2 in that it further comprises processing modules 321, 323. To avoid redundancy, the following description focuses on the difference between the sensor system of FIG. 3 and the sensor system of FIG. 2. As shown in FIG. 3, the data transmission apparatus 310 comprises a first transmission unit 332 and a second transmission unit 334. The first transmission unit 332 comprises the processing module 321 for processing sensor data, and the second transmission unit 334 comprises the processing module 323 for processing sensor data. The processing module 321 is configured to receive sensor data from sensors via the sensor interfaces 224, 226, 228, process the sensor data, and transmit the processed sensor data to the processing module 323 via the inter-chip interfaces 225, 227. The processing module 323 further processes the sensor data and then transmits the processed sensor data to the computing system 150 via the computing system interface 229.

The processing module 321 and/or the processing module 323 may process all sensor data or only a part of the sensor data from a part of sensor interfaces (or sensors).

In one implementation, the processing performed by the processing module 321 on the sensor data includes, for example, format conversion and error checking. The processing performed by the processing module 323 on the sensor data includes data fusion and the like.

In one implementation, the processing module 321 and/or the processing module 323 comprises a plurality of processing submodules, each of which corresponds to one sensor interface or one sensor type to process sensor data acquired from the corresponding sensor interface (or corresponding type of sensor). For example, if the sensor 214 is a camera, the corresponding processing submodule may perform various image processing operations to process image data captured by the camera. Similarly, if the sensor 216 is a LIDAR, the corresponding processing submodule may be configured to process LIDAR data (e.g., point cloud data). That is, depending on the type of a particular sensor, a corresponding processing submodule may be configured to process corresponding sensor data using a particular process or method corresponding to the type of sensor. The processing that can be performed by the processing module 321 and the processing module 323 on the camera data (i.e., image data captured by the camera) includes image signal processing (ISP), compression, resizing, rotation, etc., and the processing on the point cloud data acquired by the Lidar includes point cloud denoising, point cloud registration, point cloud segmentation, point cloud merging, point cloud simplification, point cloud sorting, point cloud derivation, etc. The processing module 321 and/or the processing module 323 may also denoise GPS-captured location data or resolve the universal time coordinated (UTC) of the GPS to provide an accurate timestamp to the sensor or the computing system.

In one implementation, the processing module 321 and the processing module 323 perform different processing on sensor data. For example, the processing module 321 performs image signal processing (ISP) on camera data, which includes: automatic exposure control (AEC), automatic gain control (AGC), automatic white balance (AWB), black level correction, color correction, noise removal, color interpolation, gamma correction, and/or color and contrast enhancement. The processing module 323 performs such processing as compression, resizing and rotation on the camera data. The present application limits neither the specific assignment of various sensor data processing to the processing module 321 and the processing module 323, nor the specific processing manner for the sensor data by the processing module 321 and the processing module 323.

Figure 4:
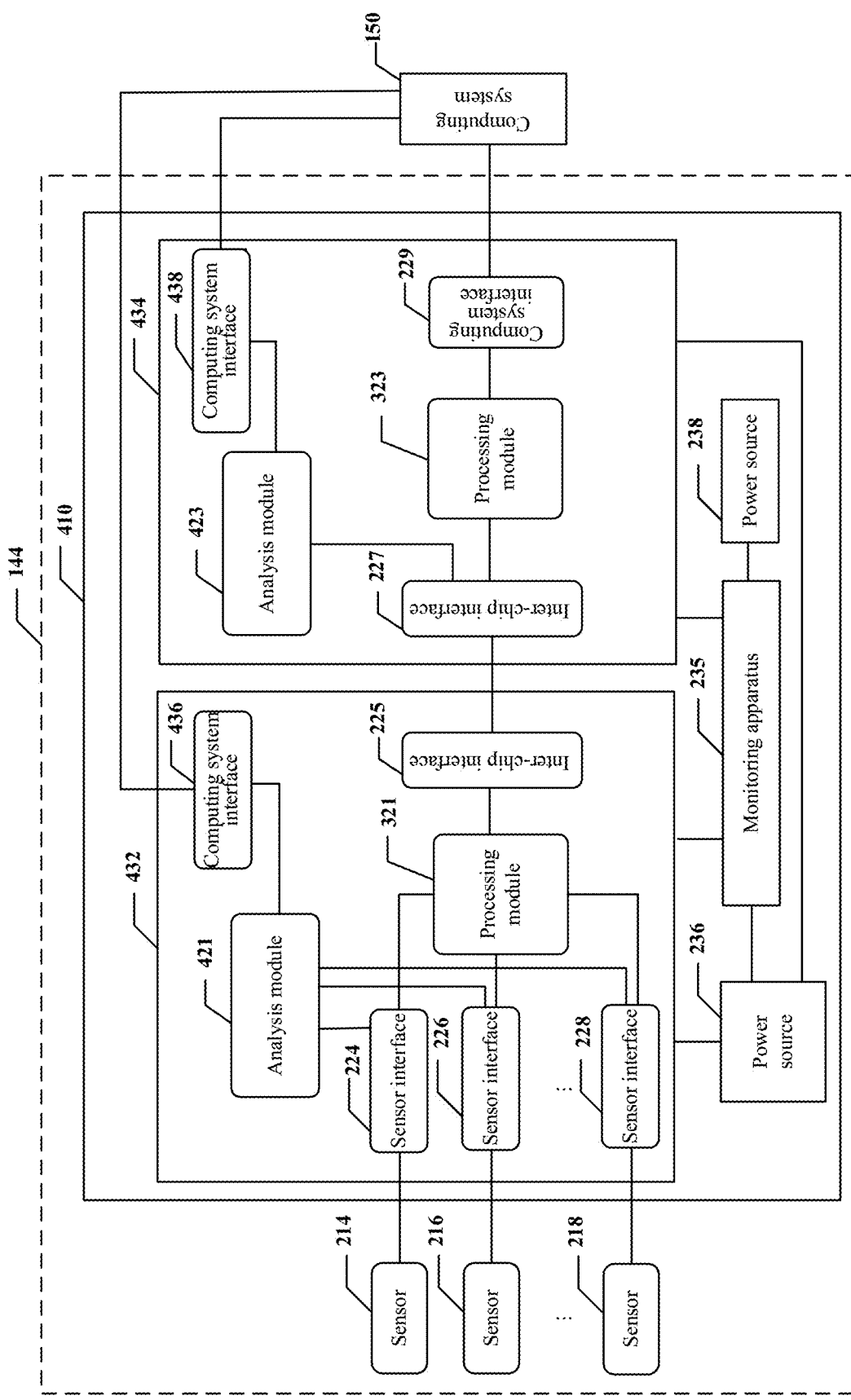
FIG. 4 is a schematic diagram of a sensor system according to yet another exemplary embodiment of the present disclosure.

FIG. 4 is a schematic diagram showing a sensor system according to another exemplary embodiment of the present disclosure. The sensor system of the embodiment of FIG. 4 is similar to the sensor system of the embodiment of FIG. 3, except that a first transmission unit 432 and a second transmission unit 434 of a data transmission apparatus 410 of FIG. 4 further comprise analysis modules 421, 423 and computing system interfaces 436, 438. To avoid redundancy, the following description focuses on the difference between the sensor system of FIG. 4 and the sensor system of FIG. 3.

In one implementation, sensor data received by the sensor interfaces 224, 226, 228 from sensors comprise sensor status data and sensor sensing data (i.e., ambient environment data sensed or acquired by the sensors, such as image data captured by a camera, point cloud data captured by a Lidar, or location data captured by a GPS). The processing modules 321, 323 are configured to process sensor sensing data (e.g., location data, image data and point cloud data captured by the sensors), and the analysis modules 421, 423 are configured to analyze sensor status data. The analysis module 421 receives sensor status data (e.g., data about operating status of the sensor, connection status of the sensor, number of output frames per second of the sensor, and voltage or temperature of the sensor) from the sensor interfaces 224, 226, 228, and the analysis module 423 receives the sensor status data from the inter-chip interface 227. The operating status of the sensor may include, for example, sensor operation, idling, abnormality, or the like. The analysis modules 421, 423 may analyze the sensor status data, for example, compare the sensor status data (e.g., data about number of output frames per second, and voltage or temperature of the sensor) with a threshold, to determine whether the sensor is in a failure state. The analysis modules 421, 423 may then report the analysis results to the computing system 150 via the computing system interfaces 436 and 438, respectively, or to the monitoring apparatus 235, which may determine an action to take based on the analysis results of the analysis modules.

Each of the computing system interfaces 436, 438 may be a Controller Area Network (CAN) interface, a Universal Asynchronous Receiver Transmitter (UART) interface, an Ethernet interface (e.g., Serial Gigabit Media Independent Interface (SGMII), a Reduced Gigabit Media Independent Interface (RGMII)), a Serial Peripheral Interface (SPI), a Base-TX interface (e.g., a Base-T1 interface), a camera interface, a Mobile Industry Processor Interface (MIPI), an Inter-Integrated Circuit (IIC) interface, an MIPI Camera Serial Interface (CSI), a high speed digital video interface (e.g., an FPD-LINK III), a high speed Peripheral Component Interconnect (PCIe) interface, a Universal Serial Bus (USB) interface, and various General Purpose Input/Output (GPIO) interfaces. In one implementation, the computing system interface 229 is an Ethernet interface (or any other high speed or high bandwidth interface).

In one implementation, instead of receiving sensor status data from the sensor interfaces 224, 226, 228, the analysis module 421 may receive sensor status data from the processing module 321. Similarly, instead of receiving sensor status data from the inter-chip interface 227, the analysis module 423 may receive sensor status data from the processing module 323.

In one implementation, the analysis modules 421, 423 may each comprise multiple application programs (APPs) that respectively analyze status data of different types of sensors. For example, one APP is responsible for analyzing status data of an Inertial Measurement Unit (IMU), one APP is responsible for analyzing status data of a Global Navigation Satellite System (GNSS) transceiver, one APP is responsible for analyzing status data of a radar (RADAR), one APP is responsible for analyzing status data of a LIDAR, one APP is responsible for analyzing status data of a solid-state laser radar, one APP is responsible for analyzing status data of an acoustic sensor, one APP is responsible for analyzing status data of an ultrasonic sensor, and one APP is responsible for analyzing status data of a camera.

In one implementation, the analysis modules 421, 423 also analyze data transmission among the sensor interfaces 224, 226, 228, the processing module 321, the inter-chip interface 225, the inter-chip interface 227, the processing module 323 and the computing system interface 229 to determine whether data loss or the like occurs during the data transmission.

In one implementation, there are other components, such as a serializer or a deserializer, between the sensor interfaces 224, 226, 228 and the sensors 214, 216, 218. At this time, the analysis modules 421, 423 also analyze status data (e.g., data about operation status, connection status, number of output frames per second, voltage or temperature) of these components.

In one implementation, the first transmission unit 432 and the second transmission units 434 may each be implemented in the form of a System on Chip (SOC) that may comprise a processing system (PS) part (SOC PS) and a programmable logic (PL) part (SOC PL). The analysis modules 421, 423 and the computing system interfaces 436, 438 may be located in the processing system (PS) part of the System on Chip (SOC), and the processing modules 321, 323, the inter-chip interfaces 225, 227 and the computing system interface 229 may be located in the programmable logic (PL) part of the System on Chip (SOC). The sensor interfaces 224, 226, 228 may be located in the programmable logic (PL) part of the System on Chip (SOC) or the processing system (PS) part of the System on Chip (SOC).

According to the implementation of the present application, in order to get the working status of each sensor timely so that the case where some sensors are abnormal can be known and treated in time, each APP of the analysis modules 421, 423 analyzes the working status of a corresponding sensor in real time/periodically during receiving the status data of the sensor, determines which sensor is abnormal according to the analysis results, and gives an alarm or generates prompting information. The analysis modules 421, 423 also synchronize the analysis results of the working status of each sensor to the computing system 150 in real time or periodically.

According to the implementation of the present application, the working status of the sensors are timely acquired and analyzed by the analysis modules 421, 423, so that a sensor failure can be discovered early to ensure the safety of a vehicle, especially an autonomous vehicle. If the computing system 150, rather than the analysis modules 421, 423, is responsible for analyzing the working status of the sensors, on the one hand, the load of the computing system would be greatly increased (the load of the computing system of an autonomous vehicle is quite huge since it needs to process a large amount of sensor data to determine the path or trajectory of the vehicle), and on the other hand, the time to acquire the sensor failure analysis results would be delayed.

Figure 5:
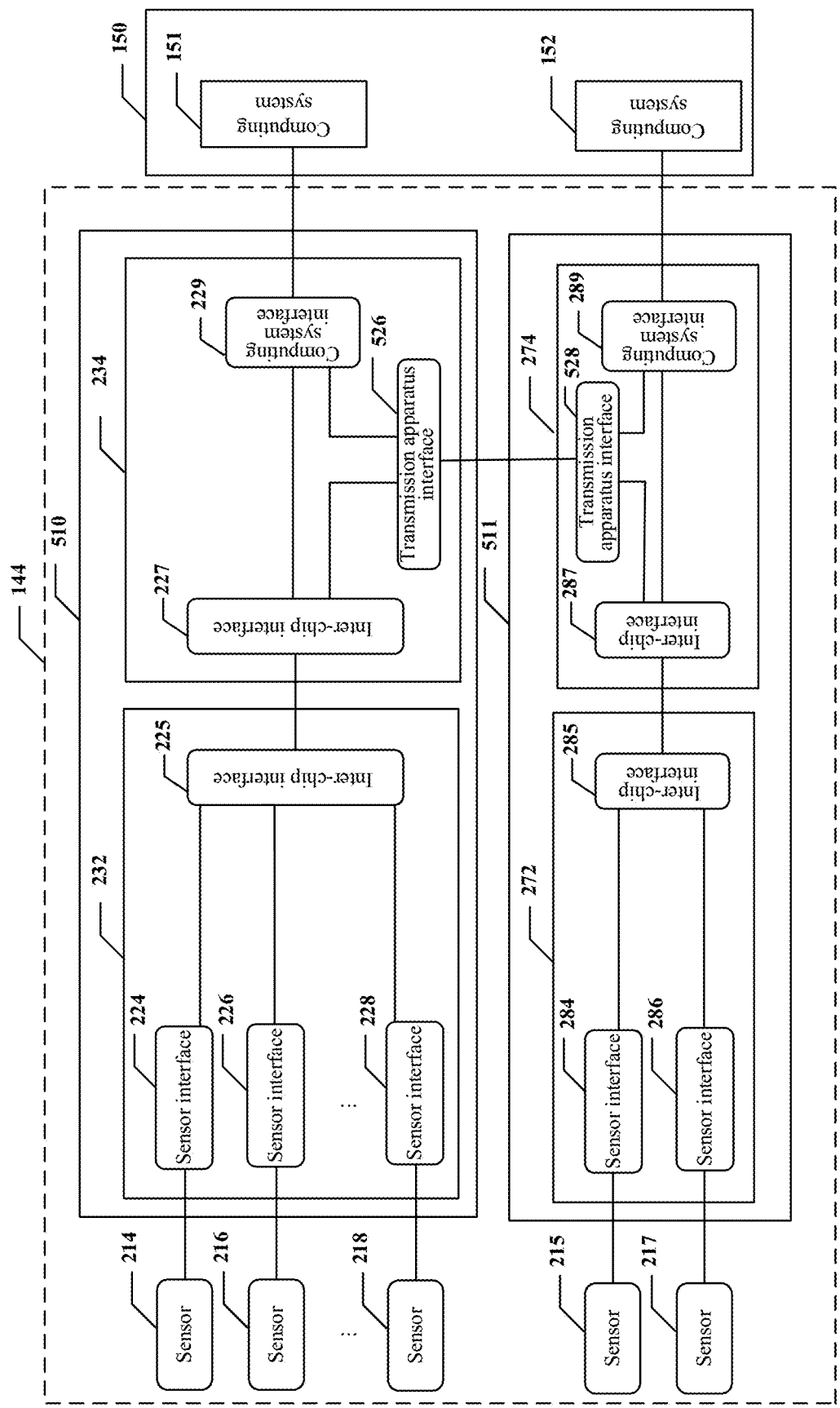
FIG. 5 is a schematic diagram of a sensor system according to still another exemplary embodiment of the present disclosure.

FIG. 5 is a schematic diagram showing a sensor system according to another exemplary embodiment of the present disclosure. The sensor system of FIG. 5 differs from the sensor system of FIG. 2 in that it comprises a plurality of data transmission apparatuses, each of which comprises a corresponding transmission apparatus interface. Particularly, the data transmission apparatus 510 of FIG. 5 is substantially the same as the data transmission apparatus 210 of FIG. 2, except that the data transmission apparatus 510 of FIG. 5 further comprises a transmission apparatus interface 526. To avoid redundancy, the following description focuses on the difference between the sensor system of FIG. 5 and the sensor system of FIG. 2. It should also be noted that the monitoring apparatus and the power source are not shown in FIG. 5 for simplicity, but those skilled in the art will appreciate that each data transmission apparatus of the sensor system of FIG. 5 may comprise a monitoring apparatus and a power source similar to those in the sensor system of FIG. 2.

As shown in FIG. 5, the sensor system 144 comprises a plurality of sensors (e.g., sensors 214, 215, 216, 217, 218) and data transmission apparatuses 510, 511. These sensors may include various sensors used in autonomous vehicles, such as an Inertial Measurement Unit (IMU), a Global Navigation Satellite System (GNSS) transceiver (e.g., a Global Positioning System (GPS) transceiver), a radar (RADAR), a laser rangefinder/LIDAR (or other distance measurement apparatuses), a solid-state laser radar, an acoustic sensor, an ultrasonic sensor and a camera or other image capture apparatuses. These sensors may also comprise a plurality of sensors for monitoring the vehicle 100 (such as an oxygen (02) monitor, a fuel gauge sensor, an engine oil pressure sensor, and temperature, humidity and pressure sensors). The computing system 150 comprises computing apparatuses 151, 152. The computing apparatuses 151, 152 may each comprise a memory, a processor and an autonomous driving control unit. The data transmission apparatus 510 is connected between the sensors 214, 216, 218 and the computing apparatus 151. The data transmission apparatus 511 is connected between the sensors 215, 217 and the computing apparatus 152. Although five sensors are shown in FIG. 5, those skilled in the art will appreciate that the sensor system 144 may comprise more or fewer sensors.

In one implementation, in addition to being sent to the computing apparatus 151 via the computing system interface 229, data received by the inter-chip interface 227 from the inter-chip interface 225 are sent to the computing apparatus 152 via the transmission apparatus interfaces 526, 528 and the computing system interface 289. Similarly, in addition to being sent to the computing apparatus 152 via the computing system interface 289, data received by the inter-chip interface 287 from the inter-chip interface 285 are sent to the computing apparatus 151 via the transmission apparatus interfaces 528, 526 and the computing system interface 229.

In one implementation, the data transmission apparatus 511 has the same structure as the data transmission apparatus 510.

In one implementation, the data transmission apparatus 511 has a structure different from that of the data transmission apparatus 510. For example, the inter-chip interfaces 285, 287, the computing system interface 289 and the transmission apparatus interface 528 of the data transmission apparatus 511 are the same as the inter-chip interfaces 225, 227, the computing system interface 229 and the transmission apparatus interface 526 of the data transmission apparatus 510, respectively, but the data transmission apparatus 511 has fewer sensor interfaces than the data transmission apparatus 510. That is, the transmission unit 274 is the same as the transmission unit 234, but the transmission unit 272 and the transmission unit 232 comprise a different number of sensor interfaces.

In one implementation, each of the transmission apparatus interfaces 526, 528 may be a Controller Area Network (CAN) interface, a Universal Asynchronous Receiver Transmitter (UART) interface, an Ethernet interface (e.g., Serial Gigabit Media Independent Interface (SGMII), a Reduced Gigabit Media Independent Interface (RGMII)), a Serial Peripheral Interface (SPI), a Base-TX interface (e.g., a Base-T1 interface), a camera interface, a Mobile Industry Processor Interface (MIPI), an Inter-Integrated Circuit (IIC) interface, an MIPI Camera Serial Interface (CSI), a high speed digital video interface (e.g., an FPD-LINK III), a high speed Peripheral Component Interconnect (PCIe) interface, a Universal Serial Bus (USB) interface, and various General Purpose Input/Output (GPIO) interfaces.

Although the data transmission apparatus 511 and the data transmission apparatus 510 are shown in FIG. 5 as being connected to different sensors, it will be appreciated by those skilled in the art that the data transmission apparatus 511 and the data transmission apparatus 510 may be connected to the same sensors (e.g., the data transmission apparatus 511 and the data transmission apparatus 510 each are connected with the sensors 214, 215, 216, 217, 218). OR, some of the sensors connected with the data transmission apparatus 511 are the same as some of the sensors connected with the data transmission apparatus 510.

In one implementation, transmission units 232, 272 each have a processing module similar to the processing module 321 of FIG. 3 between the sensor interface and the inter-chip interface, and transmission units 234, 274 each have a processing module similar to the processing module 323 of FIG. 3 between the inter-chip interface and the computing system interface.

In one implementation, the transmission units 232, 272 each have an analysis module and a computing system interface similar to the analysis module 421 and the computing system interface 436 of FIG. 4, and the transmission units 234, 274 each have an analysis module and a computing system interface similar to the analysis module 423 and the computing system interface 438 of FIG. 4.

According to the present application, multiple data transmission apparatuses are respectively connected with different computing apparatuses, and the data transmission apparatuses and the computing apparatuses share data, so that an autonomous vehicle can be ensured to continue to travel safely in the case that one data transmission apparatus or one computing apparatus fails.

Although exemplary embodiments or examples of the present disclosure have been described with reference to the accompanying drawings, it should be understood that the above exemplary discussion is not intended to be exhaustive or to limit the present invention to the precise forms disclosed. Many modifications and variations are possible in view of the above teachings. Therefore, the disclosed subject matter should not be limited to any single embodiment or example described herein, but rather should be construed in breadth and scope in accordance with the appended claims.

What is claimed is:

1. A data transmission apparatus, comprising:
   a first transmission unit comprising a System on Chip (SOC) comprising:
      a programmable logic (PL) part, comprising:
         a plurality of sensor interfaces configured to receive sensor data from a plurality of sensors, the sensor data comprising sensor status data and sensor sensing data;
         a first communication link configured to transmit the sensor sensing data received by the sensor interfaces; and
         a second communication link different from the first communication link, configured to transmit the sensor status data received by the sensor interfaces, and
      a processing system (PS) part, configured to receive, from the PL part of the SOC, the sensor status data, and
   a second transmission unit that is different from the first transmission unit, the second transmission unit comprising a computing system interface and configured to receive the sensor data from the first transmission unit and to send the sensor data to a computing system through the computing system interface,
   wherein the PS part of the SOC comprises a first analysis module and the PL part of the SOC further comprises a first processing module, wherein the first processing module and the first analysis module are connected with the plurality of sensor interfaces of the first transmission unit through the first and second communication links respectively, wherein the first analysis module is configured to analyze the sensor status data to obtain an analysis result and send the analysis result to the computing system, and wherein the first processing module is configured to perform a first processing on the sensor sensing data;
   wherein the sensor status data comprises a connection status, a number of output frames per second, a voltage or a temperature of the plurality of sensors.

2. The data transmission apparatus according to claim 1, wherein the plurality of sensor interfaces is connected with the plurality of sensors through a plurality of different protocols.

3. The data transmission apparatus according to claim 1, wherein the second transmission unit receives the sensor data from the first transmission unit through a chip-to-chip interface.

4. The data transmission apparatus according to claim 1, wherein the second transmission unit further comprises a second processing module configured to perform a second processing on the sensor sensing data, the second processing being different from the first processing.

5. The data transmission apparatus according to claim 4, wherein the second transmission unit further comprises a second analysis module configured to analyze the sensor status data.

6. The data transmission apparatus according to claim 5, wherein the second transmission unit is an SOC comprising a PL part and a PS part, the PL part of the SOC comprising the second processing module and the PS part of the SOC comprising the second analysis module.

7. The data transmission apparatus according to claim 1, further comprising a first power source configured to supply power to the first transmission unit and the second transmission unit.

8. The data transmission apparatus according to claim 7, further comprising a monitoring apparatus configured to monitor at least one of the first transmission unit, the second transmission unit and the first power source.

9. The data transmission apparatus according to claim 1, wherein each of the plurality of sensor interfaces is directly connected to the first analysis module.

10. The data transmission apparatus according to claim 1, wherein the first transmission unit further comprises a first processing module configured to perform a first processing on the sensor sensing data,
    wherein the first processing module comprises a plurality of processing submodules, each of the plurality of processing submodules is configured to receive the sensor sensing data from a different one of the plurality of sensor interfaces.

11. A data transmission system, comprising:
    a first data transmission apparatus comprising a first set of sensor interfaces and a first computing system interface and configured to receive first sensor data from a first set of sensors through the first set of sensor interfaces and to send the first sensor data to a first computing apparatus through the first computing system interface, and
    a second data transmission apparatus that is different from the first data transmission apparatus, the second data transmission apparatus comprising a second set of sensor interfaces and a second computing system interface and configured to receive second sensor data from a second set of sensors through the second set of sensor interfaces and to send the second sensor data to a second computing apparatus through the second computing system interface,
    wherein the first data transmission apparatus is further configured to send the first sensor data to the second computing apparatus through the second data transmission apparatus,
    wherein the second data transmission apparatus is further configured to send the second sensor data to the first computing apparatus through the first data transmission apparatus,
    wherein the first data transmission apparatus comprises a first transmission unit comprising a System on Chip (SOC) comprising:
       a programmable logic (PL) part comprising:
          the first set of sensor interfaces configured to receive the first sensor data from the first set of sensors, the first sensor data comprising sensor status data and sensor sensing data;
          a first communication link configured to transmit the sensor sensing data received by the first set of sensor interfaces; and a second communication link different from the first communication link, configured to transmit the sensor status data received by the first set of sensor interfaces, and a processing system (PS) part, configured to receive, from the PL part of the SOC, the sensor status data, wherein the PS part of the SOC comprises a first analysis module and the PL part of the SOC further comprises a first processing module, wherein the first processing module and the first analysis module are connected with the first set of sensor interfaces of the first transmission unit through the first and second communication links respectively, wherein the first analysis module is configured to analyze the sensor status data to obtain a analysis result and send the analysis result to the first computing apparatus, and wherein the first processing module is configured to perform a first processing on the sensor sensing data;

wherein the sensor status data comprises a connection status, a number of output frames per second, a voltage or a temperature of the first set of sensors or the second set of sensors.

12. The data transmission system according to claim 11, wherein the first set of sensors are different from the second set of sensors.

13. The data transmission system according to claim 11, wherein the first data transmission apparatus further comprises:

a second transmission unit comprising the first computing system interface and configured to receive the first sensor data from the first transmission unit and to send the first sensor data to the first computing apparatus through the first computing system interface.

14. The data transmission system according to claim 13, wherein the second transmission unit further comprises a second processing module configured to perform a second processing on the sensor sensing data, the second processing being different from the first processing.

15. The data transmission system according to claim 14, wherein the second transmission unit further comprises a second analysis module configured to analyze the sensor status data.

16. The data transmission system according to claim 15, wherein the second transmission unit is an SOC comprising a PL part and a PS part, the PL part of the SOC comprising the second processing module and the PS part of the SOC comprising the second analysis module.

* * * * *